Patented Sept. 6, 1949

2,481,473

UNITED STATES PATENT OFFICE 2,481,473

LEAD BOROSILICATE ENAMEL

Frank B. Hodgdon, Naperville, Ill., assignor to Western Electric Company, Incorporated, New York, N. Y., a corporation of New York No Drawing. Application November 3, 1945, Serial No. 626,573

5 Claims. (Cl. 106—49)

1

This invention relates to ceramic compositions and methods of making them and more particularly to ceramic coating compositions having a high adherence-to-metal characteristic and a minimum of vesicular nature and to methods of making them.

In the manufacture of wire wound resistors utilizing nickel-chromium resistance wire wound on ceramic cores, it has been the practice to insulate the resistor with a ceramic coating prepared from a thixotropic enamel slip which may include a frit, colloidal clay, magnesium carbonate, and zirconium silicate. After this composition had been fired, it was discovered that the coating adhered to the ceramic core but did not adhere to the nickel-iron alloy terminal bands, thereby weakening and lessening the effectiveness of the coating. It was also found that the fired enamel had a highly vesicular structure due to the inability of the evolved carbon dioxide to escape because of the viscous nature of the enamel in the molten condition, and in part probably due to the decomposition products of the colloidal clay. If the alkalinity of the frit is sufficient to cause deflocculation, the magnesium carbonate may be omitted and a less vesicular end product will be obtained. However, the structure is still vesicular and the adherence-to-metal qualities are not improved by the omission of the magnesium carbonate.

Objects of this invention are to provide improved ceramic coating compositions and methods of producing them.

In accordance with one embodiment of this invention strontium chloride is added to an enamel slip to give the enamel a high adherence-to-metal characteristics and a dense structure after firing. In addition, magnesium oxide is added to the slip as a deflocculant.

In the preferred embodiment of the invention, the strontium chloride is added to a suitable slip by incorporating it in the frit. It has been found that a suitable frit may be made up of the following ingredients in parts by weight as indicated:

| Ingredient: | Parts by weight |
|---|---|
| Flint | 35.7 |
| Red lead ($Pb_3O_4$) | 19.6 |
| Boric acid ($H_3BO_3$) | 30.9 |
| Borax ($Na_2B_4O_7$) | 6.6 |
| Potassium nitrate ($KNO_3$) | 5.8 |
| Chromic oxide ($Cr_2O_3$) | 0.9 |
| Cobaltic oxide ($Co_3O_4$) | 0.5 |
| Strontium chloride ($SrCl_2$) | 2.5 |

2

The mixed frit composition is then heated and when melted, it is allowed to flow into relatively cold water, thus "shattering" the frit. The frit is further pulverized in a ball mill.

The pulverized frit is then incorporated in an enamel slip which may have the following proportions by weight:

| | |
|---|---|
| Frit | 100.0 |
| Colloidal clay | 2.0 |
| Magnesium oxide (MgO) | 2.0 |
| Zirconium silicate | 9.0 |

These components may be mixed in a ball mill with a suitable amount of water to provide a fluidity and viscosity consistent with the planned use of the enamel and with the available apparatus.

Departures in the proportions shown in the example will change the maturing temperature of the enamel or the degree of water solubility of the frit or both without materially changing the adherence-to-metal characteristic or the degree of porosity of the enamel as long as the amount of magnesium oxide added to the slip is no more than is necessary to deflocculate the slip and the amount of the strontium chloride is just sufficient to inhibit the formation of a vesicular structure. The chromic oxide and the cobaltic oxide are merely pigments, and zirconium silicate provides opacity while the colloidal clay is added for body. Lead-boro-silicate ceramic compositions that are not metal adherent, will be rendered metal adherent by the addition of strontium chloride and those that are to some degree metal adherent, will have an improved metal adherence characteristic by the addition of strontium chloride.

An object may be coated by dipping it in the slip or by allowing the slip to flow upon the object, thereby covering the object. The covered object is then dried in a normal atmosphere and subjected to heat to fire the enamel. This process may be repeated to increase the thickness of the coating. It will be found that after firing the enamel, the structure is relatively dense and any metal covered by the enamel will be tenaciously adhered to by the enamel.

It was found that the high adherence-to-metal characteristic was imparted to the enamel by the addition of strontium chloride to the composition. Good results were had by omitting the strontium chloride from the frit and mixing it together with the frit and the other ingredients of the slip. However, strontium chloride being water soluble was found deposited on the outside surface of the enamel coating after firing. This was undesirable where speed of production was a prime consideration. This situation was cured by incorporating strontium chloride in the frit in which state the strontium salt is not water soluble. Strontium chloride is effective in eliminating the vesicular structure of this enamel in concentrations from 2% to 5% by weight. Contrary to expectations, the addition of strontium chloride to this enamel while it does increase the wetting properties of the enamel, decreases rather than increases the fluidity, that is, strontium chloride although normally a flux, increases the refractoriness of the enamel. The addition, however, is beneficial because it produces satisfactory adherence of the enamel to metal, which had heretofore not been accomplished with any degree of effectiveness. The maturing temperature of the enamel increases with increasing percentages of strontium chloride and it is therefore desirable to use the minimum percentage which will effect the desired result. To speed up production, the setting-up time of the enamel is decreased by adding a flux, magnesium oxide, to deflocculate the enamel. Since the vesicular nature of the fired enamel increases proportionally with the amount of magnesium oxide added, just enough magnesium oxide should be added to control the viscosity of the slip as desired. When a sufficient amount of strontium chloride necessary to inhibit the formation of a vesicular enamel structure was added it was found that the desired adherence-to-metal characteristic was also attained.

What is claimed is:

1. A ceramic slip composition comprising by weight 100 parts of frit, 2 parts of colloidal clay, 2 parts of magnesium oxide and 9 parts of zirconium silicate, said frit comprising by weight 35.7 parts of flint, 19.6 parts of red lead, 30.9 parts of boric acid, 6.6 parts of borax, 5.8 parts of potassium nitrate, .9 part of chromic oxide, .5 part of cobaltic oxide, and 2.5 parts of strontium chloride.

2. A ceramic slip composition comprising by weight 2 parts of colloidal clay, 9 parts of zirconium silicate, 100 parts of frit, and 2 parts of magnesium oxide, by weight, said frit comprising by weight 35.7 parts of flint, 14.6 parts of red lead, 30.9 parts of boric acid, 6.6 parts of borax, 5.8 parts of potassium nitrate, .9 part of chromic oxide, .5 part of cobaltic oxide, and strontium chloride in a quantity varying from 2% to 5% by weight of the whole of said ceramic composition.

3. A lead-boro-silicate enamel slip comprising a frit, and magnesium oxide as a deflocculant, said frit having incorporated therein strontium chloride in the amount of 2% to 5% by weight of the slip.

4. A lead-boro-silicate enamel slip comprising a frit and colloidal clay, said frit comprising strontium chloride in the amount of 2% to 5% by weight of the slip.

5. A composition capable, upon melting, of forming a frit for use in a lead-boro-silicate enamel slip, said composition comprising a mixture containing approximately the following ingredients substantially in parts by weight, viz., flint—35.7, red lead—19.6, boric acid—30.9, borax—6.6, potassium nitrate—5.8, metallic oxide pigments—1.4, and strontium chloride—2.5.

FRANK B. HODGDON.

REFERENCES CITED

The following references are of record in the file of this patent:

UNITED STATES PATENTS

| Number | Name | Date |
|---|---|---|
| 1,833,087 | Migeat | Nov. 24, 1931 |
| 1,938,691 | Dougherty | Dec. 12, 1933 |
| 2,326,348 | Frost et al. | Aug. 10, 1943 |
| 2,352,425 | Deyrup | June 27, 1944 |